United States Patent [19]

Elmasry

[11] Patent Number: 5,075,352

[45] Date of Patent: Dec. 24, 1991

[54] STABILIZED POLYMERIC DISPERSIONS

[75] Inventor: Mohamed A. Elmasry, St. Paul, Minn.

[73] Assignee: Minnesota Mining and Manufacturing Company, St. Paul, Minn.

[21] Appl. No.: 576,181

[22] Filed: Aug. 30, 1990

Related U.S. Application Data

[63] Continuation of Ser. No. 394,227, Aug. 15, 1989, abandoned.

[51] Int. Cl.[5] .................. C08L 87/00; C08L 55/00
[52] U.S. Cl. .................................. 523/201; 524/530; 524/535; 524/923; 525/279; 525/280; 525/293; 525/294
[58] Field of Search ............... 523/201; 524/530, 535, 524/923; 525/279, 280, 293, 294

[56]  References Cited

U.S. PATENT DOCUMENTS

| | | | |
|---|---|---|---|
| 3,488,327 | 1/1970 | Kollinsky et al. | 260/78.3 |
| 3,511,894 | 5/1970 | Markert | 260/875 |
| 3,598,790 | 8/1971 | Kollinsky et al. | 260/78.3 |
| 3,669,886 | 6/1972 | Kosel | 252/62.1 |
| 3,717,605 | 2/1973 | Osmond et al. | 524/923 |
| 3,900,412 | 8/1975 | Kosel | 252/62.1 |
| 4,304,705 | 12/1981 | Heilmann et al. | 524/530 |
| 4,451,619 | 5/1984 | Heilmann et al. | 525/326.8 |
| 4,564,574 | 1/1986 | Uytterhoeven et al. | 430/115 |
| 4,611,028 | 9/1986 | Peng et al. | 525/293 |
| 4,667,012 | 5/1987 | Rasmussen et al. | 526/263 |
| 4,695,608 | 9/1987 | Engler et al. | 525/308 |
| 4,699,843 | 10/1987 | Charbonneau et al. | 428/355 |

OTHER PUBLICATIONS

"Photoelectrochemistry of Tris(bipyridyl)ruthenium-(II) Covalently Attached to n-Type $SnO_2$," P. K. Ghosh and T. G. Spiro, J. Am. Chem. Sec. 1980 102 5543-5549.

"Chemistry of Alkenyl Azlactones. I. Radiation-Sensitive Materials Derived From Azlactone-Containing Copolymers," S. M. Heilmann et al., J. of Polymer Science, May 1984, vol. 22, No. 5, pp. 1179-1186.

Primary Examiner—Joseph L. Schofer
Assistant Examiner—R. H. Delmendo
Attorney, Agent, or Firm—Gary L. Griswold; Walter N. Kirn; Gregory A. Evearitt

[57] ABSTRACT

Stable latices of polymer particles insoluble in non-polar organic solvents are prepared by the attachment of the insoluble polymer particles to a stabilizer soluble in the non-polar organic solvent. The stabilizer comprises the adduct of a polymer bearing pendant azlactone groups which is soluble in non-polar organic solvents and an ethylenically unsaturated nucleophile bearing an azlactone reactive nucleophilic moiety.

17 Claims, No Drawings

STABILIZED POLYMERIC DISPERSIONS

This is a continuation of application Ser. No. 07/394,227 filed Aug. 15, 1989, abandoned.

TECHNICAL FIELD

This invention relates to stable, non-polar organic solvent dispersions of polymer particles insoluble in non-polar organic solvents. In particular, it relates to dispersions of insoluble polymer particles stabilized by attachment to a graft copolymer stabilizer.

BACKGROUND OF THE INVENTION

The preparation of stable, nonpolar organic solvent dispersions of polymer particles insoluble in non-polar organic solvents usually involves formation of these insoluble particles in the presence of a polymeric stabilizer soluble in non-polar solvents, such that the insoluble polymer particles become grafted to the stabilizer backbone. Typically, the insoluble polymer particles are formed by the polymerization of soluble ethylenically unsaturated monomers dissolved in the non-polar solvent. See Keith E. J. Barrett, *Dispersion Polymerization in Organic Media* (1975).

The stabilizer thus provides a lyophilic layer of soluble polymer anchored to the surface of the insoluble polymer particles. This layer provides solvation of the insoluble particles and prevents the particles from approaching each other so that a sterically stabilized colloidal dispersion is achieved. Strong anchoring of the solvated moiety to the insoluble particle is essential to prevent either desorption from the particle surface or displacement during particle collision.

The stabilizer may be a saturated polymer, in which case the insoluble particles are typically grafted onto the saturated stabilizer backbone by the use of a free radical initiator such as benzoylperoxide. The function of the initiator is to generate reactive sites on the saturated stabilizer molecule, by hydrogen abstraction, which subsequently initiate the graft polymerization of the monomeric precursors of the insoluble polymer particles at these reactive sites. Although this reaction is useful in the preparation of graft copolymers, it is often seriously limited by the reluctance of the saturated backbone to undergo free radical attack and results in a random and haphazard generation of reactive sites.

A preferred method, rather than this random and haphazard generation of reactive sites on the stabilizer backbone, is to construct the stabilizer backbone molecule in such a way as to produce ethylenically unsaturated pendant moieties on the backbone to serve as sites to be activated by the initiator for the in situ graft polymerization of the insoluble polymer particles.

Many different reactions can be utilized to introduce these ethylenically unsaturated pendant groups into the stabilizer backbone. Typically, a copolymer stabilizer precursor is formed wherein at least one of the comonomers has an unsaturated bond and a reactive group. The unsaturated bond is reacted in the copolymerization but the reactive group remains intact. The copolymer stabilizer precursor thus has pendant reactive group containing moieties. The reactive group containing moieties of the stabilizer precursor are then further reacted, with a monomer specifically selected to be reactive with the reactive group and to provide an ethylenically unsaturated site for subsequent activation and graft polymerization, to form the stabilizer backbone. Pairs of monomers which may be reacted to provide these ethylenically unsaturated pendant moieties are disclosed in U.S. Pat. No. 3,900,412. Either monomer of the pair may be copolymerized into the stabilizer precursor.

The reaction between most of these monomer pairs, however, takes place with some difficulty, especially in aliphatic hydrocarbon solvents. For example, it is usually necessary to maintain the reactants at temperatures of from about 100° to 150° C. for about 8 to 12 hours, in the presence of a tertiary amine catalyst, to convert about 25 percent of the pendant reactive groups of the stabilizer precursor into the pendant ethylenically unsaturated groups of the stabilizer. Furthermore, the reaction between these monomer pairs typically must take place in the presence of a polymerization inhibitor in order to avoid the further polymerization of the pendant ethylenically unsaturated moieties being formed with unreacted monomer in the solution.

SUMMARY OF THE INVENTION

The present invention provides a stable polymeric latex comprising amphipathic polymeric composites dispersed throughout a non-polar organic solvent. As used herein, an "amphipathic" substance is one having at least one moiety which is solvated by the solvent system and at least one moiety which is not solvated by the solvent system. The polymeric composites comprise an insoluble or substantially insoluble core polymer particle chemically anchored to a steric stabilizer soluble in the non-polar solvent.

The steric stabilizer of the invention comprises a copolymer bearing pendant ethylenically unsaturated moieties, which is formed by reacting an ethylenically unsaturated nucleophile bearing an azlactone reactive nucleophilic moiety (hereinafter referred to as an "azlactone reactive nucleophile") with a steric stabilizer precursor having pendant azlactone groups. The pendant ethylenically unsaturated moieties serve as anchoring sites for the covalent attachment of the core polymer particle.

The steric stabilizer precursor comprises a random block or graft copolymer bearing both solubilizing groups and azlactone groups. The stabilizer precursor may be prepared by either: (a) copolymerizing at least two ethylenically unsaturated monomers, at least one of which provides solubilizing groups and at least one of which is an alkenylazlactone, or (b) grafting solubilizing groups onto a polymer backbone bearing pendant azlactone groups in such quantities that some of the azlactone groups remain unreacted. The solubilizing groups stabilize the dispersion against flocculation by preventing the core polymer particles from approaching one another, such that a sterically stabilized colloidal dispersion is achieved. The alkenylazlactone provides a pendant reactive group which can be reacted with an azlactone reactive nucleophile to provide the pendant ethylenically unsaturated moiety of the steric stabilizer.

The present invention additionally provides a method of preparing a stable polymeric latex comprising amphipathic polymeric particles, formed of a steric stabilizer unit soluble in non-polar solvents chemically anchored to a core polymer particle which is insoluble or substantially insoluble in non-polar solvents, dispersed throughout a non-polar solvent.

Briefly the method comprises the steps of:
(a) forming a steric stabilizer precursor bearing both solubilizing groups and pendant azlactone groups by either: (1) copolymerizing at least two ethylenically unsaturated monomers wherein at least one of the monomers provides solubilizing groups, and at least one of the monomers is an alkenylazlactone, or (2) grafting solubilizing groups onto a polymer backbone bearing pendant azlactone groups in such quantities that some of the azlactone groups remain unreacted;

(b) forming a steric stabilizer bearing pendant ethylenically unsaturated moieties by reacting the pendant azlactone groups of the steric stabilizer precursor of step (a) with an azlactone reactive nucleophile; and (c) forming a stable polymeric latex by graft copolymerizing, in a non-polar organic solvent, monomeric precursors of the core polymer particles (hereinafter referred to as "core monomer") onto the steric stabilizer of step (b) at the pendant ethylenically unsaturated moieties.

Stable polymeric dispersions prepared by the method of the invention have been discovered to be useful as a base for liquid toners used in electrophotographic imaging, as is disclosed in copending U.S. patent application Ser. No. 279,438, now U.S. Pat. No. 4,925,766. A significant advantage of preparing stable polymeric dispersions by the method of the invention is that the reaction between the alkenylazlactone and the azlactone reactive nucleophile, which produces the attachment site for the covalent attachment of the core polymer particle to the steric stabilizer, takes place in aliphatic hydrocarbons in a few hours at room temperature. Furthermore, the progress of the reaction is easily monitored by noting the disappearance of the azlactone carbonyl characteristic absorption at a wavelength of 5.4 microns.

DETAILED DESCRIPTION OF THE INVENTION

The stable polymeric latices of the invention, comprising amphipathic polymeric composites dispersed throughout non-polar organic solvents, may be prepared by a three-step reaction sequence. The first step of the reaction sequence involves the formation of a steric stabilizer precursor bearing both solubilizing groups and pendant azlactone groups. This step may be accomplished by at least two different mechanisms. For example, the steric stabilizer precursor may be formed by grafting solubilizing groups onto a polymer backbone bearing pendant azlactone groups. However, it is preferred to form the steric stabilizer precursor by the copolymerization of one or more polymerizable comonomer(s) with at least one ethylenically unsaturated alkenylazlactone monomer. Preferably the alkenylazlactone monomer is present in an amount constituting from about 0.25 to 20.0 mole percent, and more preferably from about 1 to 5 mole percent, of the total monomers in the reaction mixture.

The polymerizable comonomer(s) useful in the formation of the steric stabilizer precursor may be any ethylenically unsaturated compound having no azlactone reactive functional groups. However, at least one of the polymerizable comonomers must be ethylenically unsaturated and provide solubilizing groups to the resulting copolymer. Suitable solubilizing groups include branched or straight hydrocarbon chains having from about 6 to about 32 carbon atoms. Examples of suitable ethylenically unsaturated polymerizable comonomers providing solubilizing groups include (meth)acrylic esters, vinyl esters, (meth)acrylamides and vinyl ethers, in which the hydrocarbon solubilizing group is selected from aliphatic moieties such as lauryl, stearyl, octyl, isooctyl, decyl, isodecyl, octadecyl, and ethylhexyl groups, or from a polymer such as poly(1,12-hydroxy stearic acid). The preferred ethylenically unsaturated polymerizable comonomers providing solubilizing groups are unsaturated fatty esters such as lauryl acrylate lauryl methacrylate, stearyl acrylate, stearyl methacrylate, octyl acrylate, octyl methacrylate, decyl acrylate, decyl methacrylate, isodecyl acrylate, isodecyl methacrylate, isooctyl acrylate, isooctyl methacrylate, octadecyl acrylate, octadecyl methacrylate, 2-ethylhexyl acrylate, 2-ethylhexyl methacrylate, and (meth)acrylated poly(1,12-hydroxystearic acid). Additionally, trimethylsiloxy terminated polydimethylsiloxane with 0.5 to 0.6 mole percent methacryloxypropylmethyl groups, (commercially available from Petrarch Systems, Inc. under the trade designation "PS-429") has been found to be a useful polymerizable comonomer for providing the required solubilizing groups to the stearic stabilizer precursor.

The ethylenically unsaturated alkenylazlactone monomers useful in the preparation of the steric stabilizer precursor include alkenylazlactone monomers of the following formula:

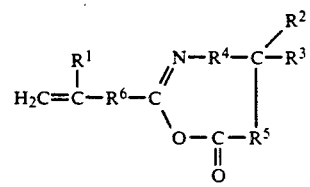

wherein,
$R^1$ is hydrogen or an alkyl group having 1 to 5 carbon atoms,
$R^2$ and $R^3$ are independently selected from alkyl groups having 1 to 8 carbon atoms,
$R^4$ and $R^5$ are independently selected from a single bond, a methylene and a substituted methylene having 1 to 12 carbon atoms, and
$R^6$ is selected from a single bond, an alkylene group having 1 to 12 carbon atoms and

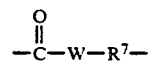

where $R^7$ is alkylene having 1 to 12 carbon atoms and W is —O—, —S—, or —NH—.

Examples of suitable ethylenically unsaturated alkenylazlactone monomers include:
2-vinyl-4,4-dimethyl-2-oxazolin-5-one,
2-isopropenyl-4,4-dimethyl-2-oxazolin-5-one,
2-vinyl-4,4-diethyl-2-oxazolin-5-one,
2-vinyl-4,4-dibutyl-2-oxazolin-5-one,
2-vinyl-4-methyl-4-phenyl-2-oxazolin-5-one,
2-vinyl-4-methyl-4-nonyl-2-oxazolin-5-one,
2-vinyl-4-methyl-4-dodecyl-2-oxazolin-5-one,
2-isopropenyl-4-methyl-4-phenyl-2-oxazolin-5-one,
2-vinyl-4,4-tetramethylene-2-oxazolin-5-one,
2-vinyl-4,4-pentamethylene-2-oxazolin-5-one,
2-isopropenyl-4,4-tetramethylene-2-oxazolin-5-one, and
2-vinyl-4,4-dimethyl-1,3-oxazin-6-one.

Fairly standard free radical polymerization conditions are utilized in the preparation of the steric stabilizer precursor except that solvents, such as alcoholic solvents, that could react with the azlactone ring by a ring-opening addition reaction are to be avoided. Useful solvents include non-polar organic liquids such as ethyl acetate, toluene, xylene, acetone, methyl ethyl ketone, acetonitrile, tetrahydrofuran, and combinations of these. Preferably the non-polar organic liquid is an aliphatic hydrocarbon.

Free radical initiators for the polymerization reaction include 2,2'-azo-bis-isobutyronitrile, benzoylperoxide and t-butyl hydroperoxide, in an amount of from about 0.1 to about 10.0 weight percent, preferably from about 0.25 to about 2.0 weight percent.

Temperatures required for the polymerization reaction are usually mild and are those necessary to effect the initiating ability of the free radical initiator. Typically, temperatures ranging from about room temperature to about 100° C. are useful. A temperature range of from about 50° C. to about 80° C. is preferred.

In the second step of the reaction sequence, the steric stabilizer precursor formed in the first step is reacted with at least one azlactone reactive nucleophile to form a steric stabilizer. The azlactone reactive nucleophilic group of the nucleophile may be selected from hydroxy, amino, or mercaptan groups. Examples of suitable ethylenically unsaturated nucleophiles include: 2-hydroxyethylmethacrylate, 3-hydroxypropylmethacrylate, 2-hydroxyethylacrylate, pentaerythritol triacrylate, 4-hydroxybutylvinylether, 9-octadecen-1-ol, cinnamyl alcohol, allyl mercaptan and methallylamine.

Optionally, in combination with the ethylenically unsaturated azlactone reactive nucleophiles, minor amounts of other nucleophiles bearing azlactone reactive functional groups may be reacted with the steric stabilizer precursor in this step. Such other nucleophiles may be, for example, nucleophiles of chromophoric compounds such as 4-butyl-N-hydroxyethyl-1,8-naphthalimide; or nucleophiles of coordinating compounds, which may include nucleophiles of salicylate compounds such as 2-hydroxyethylsalicylate or nucleophiles of bipyridene compounds such as 4-hydroxyethyl-4'-methyl-2,2'-bipyridene. However, since all of the nucleophiles compete for the available azlactone groups of the steric stabilizer precursor, these optional nucleophiles should only be present in the reaction mixture in amounts which do not reduce the quantity of pendant ethylenically unsaturated groups on the resulting steric stabilizer below that which is required to promote the formation of a latex in the third step. Furthermore, it is generally preferred that the total amount of nucleophiles present in the reaction mixture be an equivalent amount based on the amount of azlactone groups present in the steric stabilizer precursor.

The second step in the reaction sequence can be initiated simply by adding the nucleophiles and a suitable catalyst directly to the reaction mixture of the first step, after the polymerization reaction of the first step has terminated. Catalysts that are soluble in aliphatic hydrocarbons are preferred. For example, p-dodecylbenzene sulfonic acid has good solubility in hydrocarbons and is a very effective catalyst with hydroxy-functional nucleophiles. The reaction typically proceeds at room temperature in a period of several hours. When immiscible nucleophiles such as hydroxyalkylacrylates are used, strong stirring is generally necessary to ensure emulsification of the nucleophile in the polymer solution. The completion of the second stage reaction can be detected by taking the infrared spectrum of samples of the reactive mixture. The disappearance of the azlactone carbonyl characteristic absorption at a wavelength of 5.4 microns is an indication of complete conversion.

In the third step of the reaction sequence, the steric stabilizer is copolymerized with core monomer in a non-polar solvent to form a stable dispersion of amphipathic polymeric composites. Suitable core monomers are well known to those skilled in the art, and include ethylacrylate, methylacrylate, vinylacetate, methylmethacrylate, styrene, and α-methyl-styrene. The amphipathic polymeric composites typically comprise from about 3 to about 80, preferably from about 5 to about 60, percent by weight steric stabilizer. The graft copolymerization of core monomer onto the stabilizer backbone occurs at the pendant ethylenically unsaturated groups of the stabilizer. This graft copolymerization may proceed by any known polymerization mechanism such as free radical, ionic addition, condensation and ring opening. However, the preferred method is free radical polymerization. In this method, core monomer consisting of an acrylic or methacrylic ester, together with the stabilizer and an azo or peroxide free radical initiator, is dissolved in a nonpolar hydrocarbon solvent and heated until an opaque white latex is formed. Particle diameters in such latices are often well below a micron and frequently about 0.1 microns. Typically, particular size distributions for such latices are narrow with modes in the range from 80 nm to 250 nm.

The invention is further illustrated by the following nonlimiting examples wherein all parts and percentages are by weight unless otherwise specified.

The latex particle sizes listed in the Examples which follow were determined with the Coulter N4 SubMicron Particle Size Analyzer. The N4 utilizes the light scattering technique of photon correlation spectroscopy to measure the small frequency shift in the scattered light compared with the incident laser beam, due to particle translation or diffusion. (See B. Ch. "Laser Scattering", Academic Press, New York (1974) 11A). The diffusion coefficient is the measured parameter which is related to the particle size. The N4 can accurately determine size and estimate size distributions for particles having diameters in the range of from 25 nm to 2500 nm.

EXAMPLE 1

A steric stabilizer precursor solution was prepared by mixing together 98.0 g of 2-ethylhexylacrylate, 2.0 g of 2-vinyl-4,4-dimethyl-2-oxazolin-5-one, 1.0 g of 2,2'-azo-bis-isobutyronitrile (AIBN) and 200.0 g of Isopar G (a mixture of aliphatic hydrocarbons, marketed by Exxon, having a high electrical resistivity, a dielectric constant below 3.5, and a boiling point of about 150° C.). The mixture was heated in a nitrogen atmosphere to a temperature of 70° C. and maintained at that temperature. After about 10 minutes of heating, an exothermic polymerization reaction began and the temperature of the mixture climbed to 118° C. The heating element was removed and the mixture was allowed to cool. When the temperature of the mixture had dropped to 65° C., the heating element was replaced and the mixture was maintained at that temperature overnight. The heating element was then removed and the mixture was allowed to cool to room temperature. A clear polymeric solution resulted.

An IR spectrum of a dry film of the polymeric solution showed an azlactone carbonyl peak at 5.4 microns.

EXAMPLE 2

A steric stabilizer solution was prepared by adding, to the polymeric solution of Example 1, a mixture containing 2.0 g of 2-hydroxyethylmethacrylate and 1.5 g of a 10% solution of p-dodecylbenzene sulfonic acid in heptane. The resulting mixture was stirred at room temperature over-night.

An IR spectrum of a dry film of the polymeric solution showed the disappearance of the azlacetone carbonyl peak at 5.4 microns.

EXAMPLE 3

A polyvinylacetate latex was prepared by adding, to 11.0 g of the steric stabilizer solution of Example 2, 70.0 g Isopar G, 0.5 g of AIBN, and 33.3 g of vinylacetate. The resulting mixture was heated to a temperature of 85° C. and maintained at that temperature. After about 10 minutes of heating, an exothermic polymerization reaction began and the temperature of the mixture climbed to 100° C. A small amount of petroleum ether (having a boiling temperature ranging from about 35° C. to about 60° C.) was then added to lower the temperature of the mixture to 85° C. Heating was continued for a period of 3 hours, at which time 200mg of AIBN was added. The resulting mixture was then maintained at a temperature of 85° C. for an additional 3 hour period. A portion (about 20 ml) of the Isopar G was then distilled off under reduced pressure and a white latex, having a particle size ranging from about 0.13 microns to about 0.23 microns, was obtained.

EXAMPLE 4

A polyethylacrylate latex was prepared by adding, to 50.0 g of the steric stabilizer solution of Example 2, 425.0 g of Isopar G, 35.0 g of ethylacrylate, and 0.5 g of AIBN. The resulting mixture was heated in a nitrogen atmosphere to 70° C. and maintained at that temperature for 12 hours. A portion of the Isopar G was then distilled off under reduced pressure and a white latex, having a particle size ranging from about 0.08 microns to about 0.11 microns, was obtained.

EXAMPLE 5

A polymethylacrylate latex was prepared by the method of Example 4 with the exception that methylacrylate was substituted for ethylacrylate. The latex had a particle size ranging from about 0.09 microns to about 0.135 microns.

EXAMPLE 6

A poly methylmethacrylate latex was prepared by the method of Example 4 with the exception that methylmethacrylate was substituted for ethylacrylate. The latex had a particle size ranging from about 0.12 microns to about 0.18 microns.

EXAMPLE 7

A poly methylmethacrylate latex was prepared by mixing together 12.0 g of methylmethacrylate, 11.0 g of the steric stabilizer solution of Example 2, 0.2 g of AIBN, 5.0 g Isopar G, and 30.0 ml of petroleum ether (boiling temperature ranging from about 35° C. to about 60° C.). The resulting mixture was then heated to reflux at about 81° C. and the temperature was maintained at this level by evaporating or adding petroleum ether as necessary. After 15 minutes of refluxing, the mixture turned white indicating the formation of a latex, at which time a second mixture, containing the following components, was added: 20.0 g of methylmethacrylate, 5.0 g of the steric stabilizer solution of Example 2, 0.12 g of AIBN, 0.2 g of a 10% solution of lauryl mercaptan in Isopar G, 10.0 g of Isopar G, and 7.0 g of petroleum ether (boiling temperature ranging from about 35° C. to about 60° C.). The second mixture was added at a constant rate over a period of 3 hours. After the addition of the second mixture was finished, refluxing was continued for an additional half hour. After cooling to room temperature, the petroleum ether was distilled off under reduced pressure and the resulting product was a white latex having a particle size ranging from about 0.10 microns to about 0.20 microns.

EXAMPLE 8

A steric stabilizer precursor solution was prepared by mixing together 96.0 g of lauryl methacrylate, 4.0 g of 2-vinyl-4,4-dimethyl-2-oxazolin- 5-one, 1.0 g of AIBN and 200.0 ml of ethylacetate. The resulting mixture was heated in a nitrogen atmosphere to a temperature of 70° C. and maintained at that temperature for a period of 12 hours. A clear polymeric solution was obtained.

An IR spectrum of a dry film of the resulting polymeric solution showed an azlactone carbonyl peak at 5.4 micron.

EXAMPLE 9

A steric stabilizer solution was prepared by adding, to the steric stabilizer precursor solution of Example 8, 1.4 g of hydroxyethylmethacrylate, 3.27 g of 2-hydroxyethylsalicylate and 2.0 g of a 10% solution of p-dodecylbenzene sulfonic acid in heptane. The resulting mixture was then stirred overnight at room temperature. Thereafter, 200.0 ml of Isopar G was added to the solution and the ethylacetate was distilled off under reduced pressure.

An IR spectrum of a dry film of the resulting polymeric solution showed the disappearance of at least 95% of the azlactone carbonyl peak at 5.4 microns.

EXAMPLE 10

A polyethylacrylate latex was prepared from the steric stabilizer solution of Example 9 by the method described above for Example 4. The latex had a particle size ranging from about 0.13 microns to about 0.195 microns.

EXAMPLE 11

A steric stabilizer solution was prepared by the method of Example 9 with the exception that 0.018 mole of 4-hydroxyethyl-4'-methyl-2,2'-bipyridene was substituted for the salicylate compound and 0.3 g of 1,8-diazabicyclo [5,4,0] undec-7-ene was substituted for the p-dodecylbenzene sulfonic acid catalyst solution.

An IR spectrum of a dry film of the resulting polymeric solution showed the disappearance of more than 85% of the azlactone carbonyl peak at 5.4 microns.

EXAMPLE 12

A polyethylacrylate latex was prepared from the steric stabilizer solution of Example 11 by the method described above for Example 4. The latex had a particle size ranging from about 0.11 microns to about 0.15 microns.

EXAMPLE 13

A steric stabilizer solution was prepared by the method of Example 9 with the exception that 0.018 mole of 4-hydroxymethylbenzo-15-crown-5 was substituted for the salicylate compound.

EXAMPLE 14

A polyethylacrylate latex was prepared from the steric stabilizer solution of Example 13 by the method described above for Example 4. The latex had a particle size ranging from about 0.10 microns to about 0.15 microns.

EXAMPLE 15

A steric stabilizer solution was prepared by the method of Example 9 with the exception that 0.018 mole of 4-butyl-N-hydroxyethyl-1,8-naphthalimide was substituted for the salicylate compound.

EXAMPLE 16

A polyethylacrylate latex was prepared from the steric stabilizer solution of Example 15 by the method described above for Example 4. The latex had a particle size ranging from about 0.14 microns to about 0.21 microns.

What is claimed is:

1. A stable polymeric latex comprising amphipathic polymeric composites dispersed throughout a non-polar solvent, said polymeric composites comprising an insoluble or substantially insoluble core polymer particle in which monomeric precursors of the core polymer particle are copolymerized with a steric stabilizer, said steric stabilizer consisting essentially of an adduct of:
    (a) a steric stabilizer precursor consisting essentially of a block copolymer or graft copolymer consisting of both solubilizing groups and pendant azlactone groups, with
    (b) at least one ethylenically unsaturated nucleophile bearing an azlactone reactive nucleophilic moiety.

2. A polymeric latex as recited in claim 1 wherein said core polymer particle is derived from monomers selected from the group consisting of ethylacrylate, methylacrylate, methylmethacrylate, styrene, α-methyl-styrene, and vinylacetate.

3. A polymeric latex as recited in claim 1 wherein said amphipathic polymeric composites comprise from about 5 to about 60 percent by weight steric stabilizer.

4. A polymeric latex as recited in claim 1 wherein said azlactone reactive nucleophilic moiety is selected from the group consisting of hydroxy, amino and mercaptan moieties.

5. A polymeric latex as recited in claim 1 wherein said ethylenically unsaturated nucleophile is selected from the group consisting of 2-hydroxyethylmethacrylate, 3-hydroxypropylmethacrylate, 2-hydroxyethyl-acrylate, pentaerythritol triacrylate, 4-hydroxybutylvinylether, 9-octadecen-1-ol, cinnamyl alcohol, allyl mercaptan and methallylamine.

6. A polymeric latex as recited in claim 1 wherein said steric stabilizer precursor consists essentially of a random block or graft copolymer of at least two ethylenically unsaturated monomers wherein at least one of said monomers provides solubilizing groups and at least one of said monomers is an alkenylazlactone.

7. A polymeric latex as recited in claim 6 wherein said alkenylazlactone has the following structural formula:

$$\begin{array}{c} R^1 \\ | \\ H_2C=C-R^6-C \end{array} \begin{array}{c} R^2 \\ / \\ N-R^4-C-R^3 \\ \| \\ O-C-R^5 \\ \| \\ O \end{array}$$

wherein,
 R$^1$ is hydrogen or an alkyl group having 1 to 5 carbon atoms,
 R$^2$ and R$^3$ are independently selected from alkyl groups having 1 to 8 carbon atoms,
 R$^4$ and R$^5$ are independently selected from a single bond, a methylene and a substituted methylene having 1 to 12 carbon atoms, and
 R$^6$ is selected from a single bond, an alkylene group having 1 to 12 carbon atoms and $$\begin{array}{c} O \\ \| \\ -C-W-R^7- \end{array}$$

where R$^7$ is alkylene having 1 to 12 carbon atoms and W is —O—, —S—, or —NH—.

8. A polymeric latex as recited in claim 7 wherein said alkenylazlactone is selected from the group consisting of:
    2-vinyl-4,4-dimethyl-2-oxazolin-5-one,
    2-isopropenyl-4,4-dimethyl-2-oxazolin-5-one,
    2-vinyl-4,4-diethyl-2-oxazolin-5-one,
    2-vinyl-4,4-dibutyl-2-oxazolin-5-one,
    2-vinyl-4-methyl-4-phenyl-2-oxazolin-5-one,
    2-vinyl-4-methyl-4-nonyl-2-oxazolin-5-one,
    2-vinyl-4-methyl-4-dodecyl-2-oxazolin-5-one,
    2-isopropenyl-4-methyl-4-phenyl-2-oxazolin-5-one,
    2-isopropenyl-4-methyl-4-benzyl-2-oxazolin-5-one,
    2-vinyl-4,4-tetramethylene-2-oxazolin-5-one,
    2-vinyl-4,4-pentamethylene-2-oxazolin-5-one,
    2-isopropenyl-4,4-tetramethylene-2-oxazolin-5-one, and
    2-vinyl-4,4-dimethyl-1,3-oxazin-6-one.

9. A polymeric latex as recited in claim 6 wherein said ethylenically unsaturated monomer providing solubilizing groups is a fatty ester.

10. A polymeric latex as recited in claim 9 wherein said fatty ester is selected from the group consisting of lauryl acrylate, lauryl methacrylate, stearyl acrylate, stearyl methacrylate octyl acrylate, octyl methacrylate, decyl acrylate, decyl methacrylate, isodecyl acrylate, isodecyl methacrylate, isooctyl acrylate, isooctyl methacrylate, octadecyl acrylate, octadecyl methacrylate, 2-ethylhexyl acrylate, 2-ethylhexyl methacrylate, and (meth)acrylated poly (1,12-hydroxy stearic acid).

11. A polymeric latex as recited in claim 1 wherein said steric stabilizer further contains an adduct of said steric stabilizer precursor with a nucleophile of a coordinating compound bearing an azlactone reactive nucleophilic group.

12. A polymeric latex as recited in claim 11 wherein said nucleophile of a coordinating compound is selected from the group consisting of 4-hydroxyethyl-4'-methyl-2,2'-bipyridene, 2-hydroxyethylsalicylate and 4-hydroxymethylbenzo-15-5.

13. A polymeric latex as recited in claim 1 wherein said steric stabilizer further contains an adduct of said steric stabilizer precursor with a nucleophile of a chromophoric compound bearing an azlactone reactive nucleophilic group.

14. A polymeric latex as recited in claim 13 wherein said nucleophile of a chromophoric compound is 4-butyl-N-hydroxyethyl-1,8-naphthalimide.

15. A polymeric latex as recited in claim 1 wherein said non-polar organic solvent consists essentially of aliphatic hydrocarbons.

16. A polymeric latex as recited in claim 7 wherein said $R^4$, $R^5$ and $R^6$ groups of said alkenylazlactone comprise single bonds.

17. A stable polymeric latex comprising amphipathic polymeric composites dispersed throughout a non-polar organic solvent, said polymeric composites comprising an insoluble or substantially insoluble core polymer particle in which monomeric precursors of the core polymer particle are copolymerized with a steric stabilizer, said steric stabilizer consisting essentially of an adduct of:
  (a) a steric stabilizer precursor consisting essentially of a block copolymer or graft copolymer consisting of both solubilizing groups and pendant azlactone groups, with
  (b) at least one ethylenically unsaturated nucleophile bearing an azlactone reactive nucleophilic moiety.

* * * * *